United States Patent
Andrews

(10) Patent No.: US 6,833,693 B2
(45) Date of Patent: Dec. 21, 2004

(54) EMI REDUCTION OF POWER CONVERTERS BY WAY OF CONTROLLED RANDOMIZED MODULATION OF OSCILLATING SIGNALS

(75) Inventor: Michael Andrews, Fort Collins, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 45 days.

(21) Appl. No.: 10/426,434

(22) Filed: Apr. 30, 2003

(65) Prior Publication Data

US 2004/0217748 A1 Nov. 4, 2004

(51) Int. Cl.[7] ............................................. G05F 1/40
(52) U.S. Cl. ......................................................... 323/288
(58) Field of Search ................................. 323/265, 282, 323/284, 288, 351

(56) References Cited

U.S. PATENT DOCUMENTS

| | | | |
|---|---|---|---|
| 5,216,713 A | | 6/1993 | Lindholm |
| 5,263,055 A | | 11/1993 | Cahill |
| 5,321,409 A | | 6/1994 | Walker |
| 5,488,627 A | | 1/1996 | Hardin |
| 5,640,315 A | * | 6/1997 | Hirano et al. ................. 363/41 |
| 6,021,054 A | | 2/2000 | Ueki |
| 6,031,299 A | | 2/2000 | Stumfall |
| 6,031,366 A | | 2/2000 | Mitsuishi |
| 6,031,414 A | | 2/2000 | Kitamura |
| 6,058,030 A | | 5/2000 | Hawkes |
| 6,075,716 A | | 6/2000 | He |
| 6,147,552 A | * | 11/2000 | Sauer ............................ 330/9 |
| 6,476,577 B1 | * | 11/2002 | Gluch .......................... 318/631 |
| 6,600,295 B2 | * | 7/2003 | Kanekawa et al. ......... 323/222 |

OTHER PUBLICATIONS

J.H.B. Deane and D.C. Hamill, "Improvement Of Power Supply EMC By Chaos" (Jun. 6, 1996), Electronics Letters, vol. 32 No. 12, p 1045.

R. Giral, et al. "Current Control Technique For Improving EMC In Power Converters" (Mar. 1, 2001) Electronics Letters, vol. 37, No. 5, pp. 274–275.

(List continued on next page.)

Primary Examiner—Michael Sherry
Assistant Examiner—Gary L. Laxton
(74) Attorney, Agent, or Firm—Kyle J. Way

(57) ABSTRACT

A switching control circuit for a switching power converter utilizes an oscillating signal that causes reduced electromagnetic interference by the power converter by way of modulating the frequency of the oscillating signal within a specified frequency range. An output voltage monitor circuit monitors the output voltage of the power converter, thus producing an output voltage monitor signal. Also, a randomized signal generator creates a randomized signal, which is then used to drive a frequency range converter that is employed to produce a frequency modulation signal. The current state of the frequency modulation signal is based on the current state of the randomized signal, with the frequency range converter limiting the current state of the frequency modulation signal so that the oscillating signal will only operate within the specified frequency range. A variable frequency oscillator then generates the oscillating signal whose frequency is based on the current state of the frequency modulation signal. A comparator then compares the oscillating signal with the output voltage monitor signal to produce a switch control signal, which is then employed to control a switching element of the power converter.

45 Claims, 7 Drawing Sheets

OTHER PUBLICATIONS

Yoshifumi Nishio, et al. "Extremely Simple Hyperchaos Generators Including One Diode" 0–7803–0593–0/921992 IEEE, pp. 2797–2800.

Aleksandar M. Stankovic, et al. "Randomized Modulation In Power Electronic Converters" (May 2002) Proceedings Of The IEEE, vol. 90, No. 5, pp 782–799.

Manuel Delgado–Restituto, et al. Integrated Chaos Generators, (May 2002) Proceedings Of the IEEE, vol. 90, No. 5, pp 747–767.

R. Rovatti, G. Setti, S. Graffi, "Chaos–Based FM of Clock Signals for EMI Reduction" 14th European Conference on Circuit Theory and Design (ECCTD '99) pp 373–376, no month.

* cited by examiner

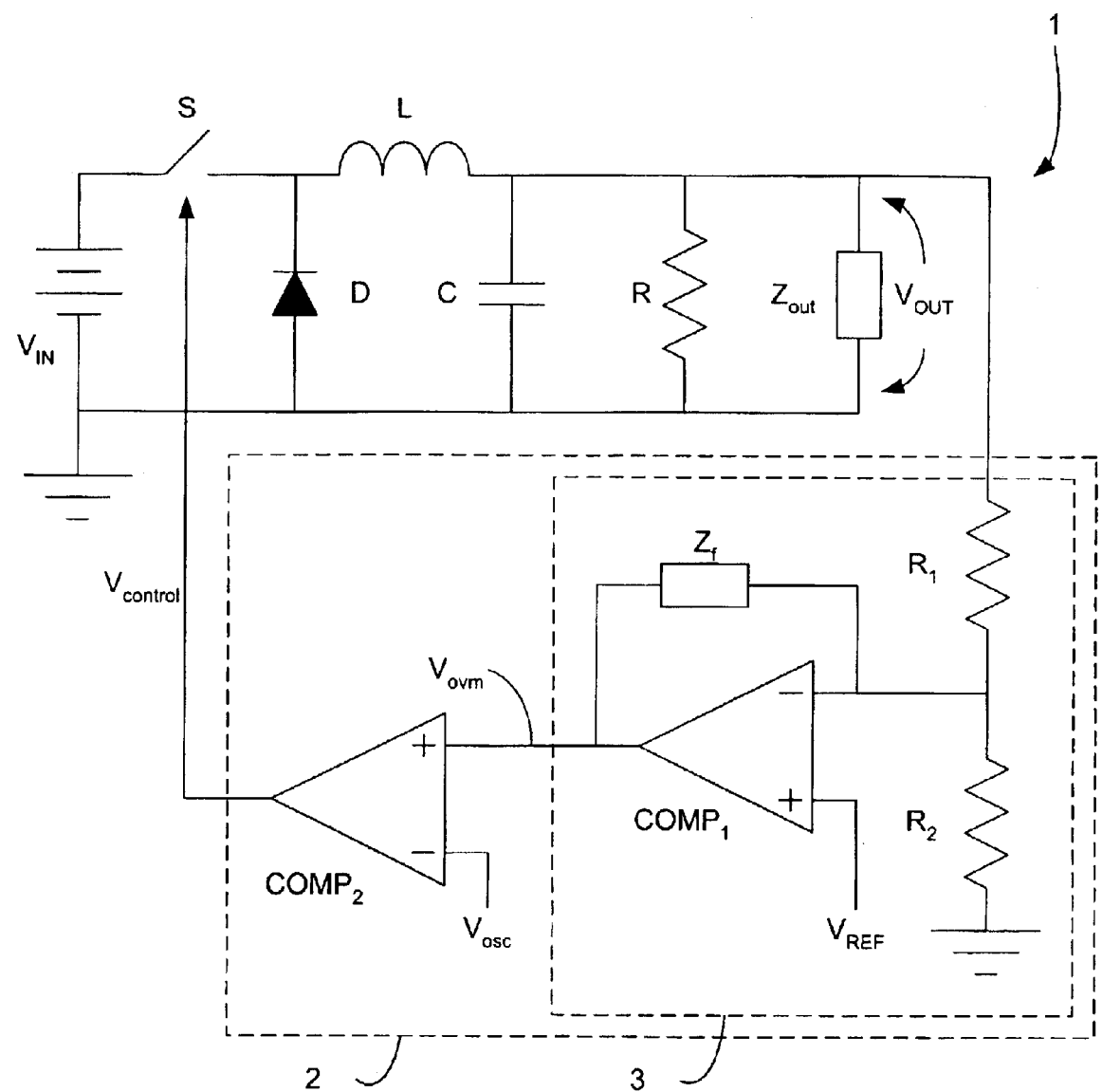
FIG. A
PRIOR ART

EMI REDUCTION OF POWER CONVERTERS BY WAY OF CONTROLLED RANDOMIZED MODULATION OF OSCILLATING SIGNALS

BACKGROUND OF THE INVENTION

Most modern electronic devices manufactured today contain at least one electrical signal line which is an unwanted source of electrical "noise", thereby adversely affecting other electronic circuits, both within and external to the electronic device. Generally speaking, this noise exists in the form of electromagnetic interference (EMI) of nearby electrical signals by the offending electrical signal. This EMI may be conducted from the offending electrical signal line to others by way of an electrically conductive path. Alternately, the interference may be radiated from the offending electrical signal line to nearby circuits without the benefit of a directly conductive connection. Oftentimes, the result of such radiated or conducted noise is erroneous or improper operation of the circuit being affected by the EMI, due primarily to unexpected voltage changes in the affected circuit. As a result, protecting electrical circuits from EMI that is generated by other signal lines has long been an important facet of the electronic circuit and device design process.

One example of a source of such noise is a switching power supply or converter, which typically is an electrical circuit designed to convert a power source from one form into another that is usable by another electrical circuit. For example, a direct-current/direct-current (DC/DC) converter transforms an input DC power source, such as a 12 volt (V) DC power source, into an output DC power source with a higher or lower voltage compared to the input source. Other switching power converters, such as AC/DC converters, DC/AC converters, and the like, can exhibit similar noise properties.

One simple example of a DC/DC converter is the buck converter 1 shown in FIG. A. A switch S, which is typically a transistor, is employed to energize an inductor L intermittently via an input DC voltage $V_{IN}$ so that an output voltage $V_{OUT}$ remains substantially consistent. The inductor L thus is used as an energy-storage component, with the overwhelming majority of that energy then being delivered to a load $Z_{out}$. The diode D is employed to provide a closed circuit for energy dissipation of the inductor when the switch S is open. The values for the inductor L, a capacitor C, and a resistor R are chosen to restrict certain characteristics of the converter 1 to levels that are acceptable to the load driven. These characteristics include, for example, overshoot and peak-to-peak ripple of the output voltage $V_{OUT}$.

The opening and closing of the switch S is determined by a switching control circuit 2. The switching control circuit 2 is often comprised in part of an output voltage monitor circuit 3, which monitors the output voltage $V_{OUT}$ of converter 1. The output voltage monitor circuit 3 may consist of, for example, a voltage divider formed by a first and second resistors $R_1$ and $R_2$. The output of the voltage divider is then presented to an input of a first voltage comparator $COMP_1$, which compares that voltage against a DC reference voltage $V_{REF}$, thus generating an output voltage monitor signal $V_{ovm}$. A feedback impedance $Z_f$ may also be used to control the output of the first comparator $COMP_1$.

Aside from the output voltage monitor circuit 3, the switching control circuit 2 also includes a second comparator $COMP_2$, which compares the output voltage monitor signal $V_{ovm}$ with an oscillating signal $V_{osc}$. Often the oscillating signal $V_{osc}$ is a periodic ramp voltage, although other types of oscillating signals, such as square waves and sinusoidal waves, may also be employed. The output of the second comparator $COMP_2$ thus serves as the switch control signal $V_{control}$, operating in pulse-width-modulation (PWM) mode, for opening and closing the switch S based on the demands of the load $Z_{out}$.

While switching power supplies are well-known for their high efficiency, the typically high current switching levels of the energy storage component, such as the inductor L of the buck converter 1 of FIG. A, normally generate conducted and radiated EMI into surrounding electronic circuits. The power spectral density of this EMI typically takes the form of noise spikes at the fundamental frequency and harmonic frequencies of the PWM control signal used to open and close the switching element of the switching power supply.

Several methods of protecting circuits from EMI generated by switching power supplies have been employed previously. Many such methods involve protecting the sensitive circuits of the electronic device involved from the noise effects of the power converter. For example, the electronic circuit designer often attempts to structure the physical layout of the electronic circuits on a printed circuit board (PCB) so that the generated EMI of the converter will have an attenuated effect on other surrounding circuits. Such efforts include physically routing any offending signals remotely from other sensitive signal lines and circuits, utilizing additional ground planes within the PCB to electrically shield and separate the power converter from surrounding circuits, and the like. Unfortunately, such efforts normally require exorbitant amounts of a PCB designer's time and effort, and are also error-prone, requiring multiple circuit design revisions in order to reduce sufficiently the effects of the noise on the device.

Other similar solutions involve more substantive circuit additions to shield radiated and conducted noise from circuits that are sensitive to that noise. These additions include the use of large and complex filters on the PCB, chokes, additional metal shielding, shielded cables, and so on.

In contrast to the solutions above, more recent approaches to the problem involve changing the nature of the offending power supply to make that signal less of a noise source to surrounding circuitry. For example, one proposed solution has been to "dither" the oscillating signal $V_{osc}$ by adding a small noise signal to the oscillating signal itself. Dithering of the oscillating signal results in displacing the frequency spectrum of the offending noise a small amount, but does not lower the power level of the frequency spectrum. This solution has been utilized in devices in which other circuits within the device are sensitive to noise at particular frequencies, because the small displacement in the frequency spectrum of the oscillating signal may aid in reducing the effects of the noise on that circuit. However, many electronic devices are susceptible to noise across a wide range of frequencies, making this solution inapplicable in such cases. For example, dithering of the oscillating signal is particularly ineffective for electronic devices such as electronic test and measurement instruments, which often are employed to investigate electronic signals over a very wide band of the frequency spectrum.

Other prior art solutions, such as those indicated in "Current control technique for improving EMC in power converters," ELECTRONIC LETTERS, Vol. 37, No. 5, pp. 274–275 (Mar. 1, 2001) by Giral et al., and "Improvement of power supply EMC by chaos," ELECTRONIC LETTERS, Vol. 32, No 12, p. 1045 (Jun. 6, 1996) by Deane et al., focus on the use of chaotic control of DC/DC power converters to reduce the electromagnetic interference normally generated by such circuits. Such solutions succeed in reducing the peaks of the frequency spectrum due to the control signal associated with such converters by spreading out the power of the spectrum at the fundamental and harmonic frequencies. However, such solutions typically do not ensure failsafe operation of the converter being driven by the offending control signal due to its chaotic nature. Adding chaotic control as described by the prior art does not guarantee that the switch will not remain in the closed position, thus potentially causing permanent damage to the inductor of the converter by way of sustained electrical current. By the same token, the circuit described may not prevent excessive periods of time during which the inductor is not being charged, thus allowing the output voltage of the power supply to drop unacceptably.

Another solution, identified by Cahill in U.S. Pat. No. 5,263,055, entitled "APPARATUS AND METHOD FOR REDUCING HARMONIC INTERFERENCE GENERERATED BY A CLOCK SIGNAL", implements a periodic clock signal that is frequency modulated, or alternately, phase modulated, by the output of a pseudorandom noise signal generator. While the power spectral energy of the fundamental and harmonic frequencies of the periodic clock signal is reduced, no control mechanism is present which ensures that the changing frequency of the modulated signal remains within the limits required of the circuit that is being driven by that signal. Hence, such a method, as applied to the control signal of a switching power supply, is also likely to allow the switch associated with the energy storage component of the supply, normally an inductor, to remain open or closed for lengthy periods of time occasionally.

From the foregoing, despite previous attempts to mitigate or reduce EMI generated by switching power supplies, a need still exists for a reliable method of reducing the EMI generated by such supplies. Such a method should both reduce the EMI generated while ensuring that the timing characteristics of the control signal driving the power supply reside within a specified range to ensure effective, nondestructive operation of the supply.

SUMMARY OF THE INVENTION

Embodiments of the invention, to be discussed in detail below, provide a switching control circuit for generating a switch control signal for a switching power converter. An output voltage monitor circuit is employed to monitor the output voltage of the power converter, thus producing an output voltage monitor signal. Also, a randomized signal generator is employed to create a randomized signal used as input for a frequency range converter. This range converter, in turn, produces a frequency modulation signal, the current state of which is based on the current state of the randomized signal. Additionally, the frequency range converter limits the current state of the frequency modulation signal so that the oscillating signal that is ultimately produced will operate within the specified frequency range. A variable frequency oscillator then generates the oscillating signal, the frequency of which is based on the current state of a frequency modulation signal. A comparator then compares the voltage of the oscillating signal with the output voltage monitor signal, thereby producing the switch control signal.

By modulating the frequency of the oscillating signal in this manner, the overall EMI produced by the energy storage component of the power converter is reduced in comparison to those power converters that employ oscillating signals of a fixed frequency. Furthermore, by restricting the frequency of the oscillating signal to the specified frequency range, the proper operation of the power converter driven by the oscillating signal is maintained, thus helping to prevent unacceptable voltage dropouts and irreparable damage to the energy storage component.

Other aspects and advantages of the invention will become apparent from the following detailed description, taken in conjunction with the accompanying drawings, illustrating by way of example the principles of the invention.

BRIEF DESCRIPTION OF THE DRAWINGS

FIG. A is an example of a DC/DC buck converter that may benefit from embodiments of the present invention.

DETAILED DESCRIPTION OF THE PREFERRED EMBODIMENTS

Figure 1:
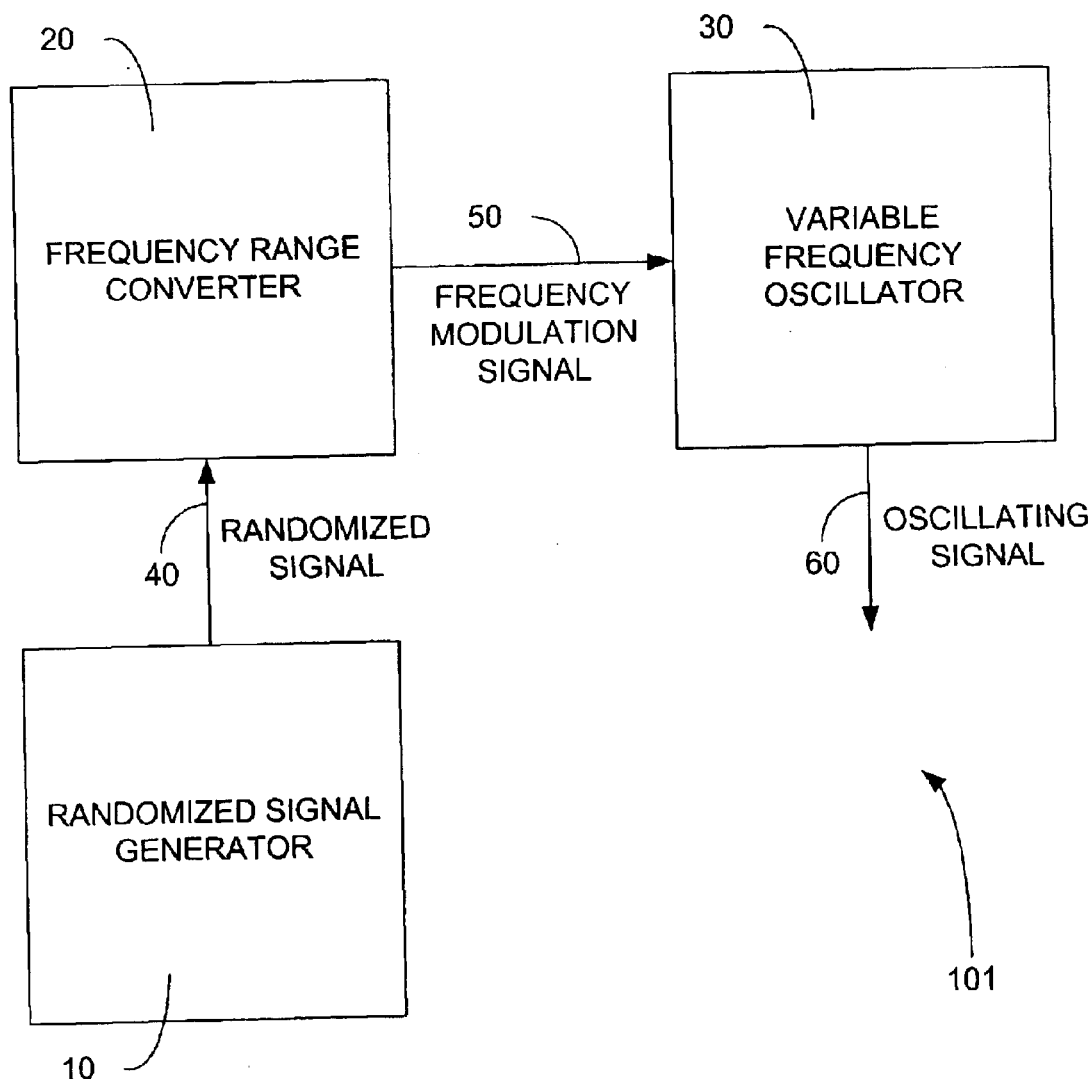
FIG. 1 is a high-level block diagram of a portion of a power converter switching control circuit according to an embodiment of the invention that generates an oscillating signal.

An example of an electrical circuit 101 for generating a oscillating signal that is employed in a switching control circuit of a switching power converter is shown in FIG. 1. Generally speaking, a randomized signal generator 10 is employed to generate a randomized signal 40, which is then transferred to a frequency range converter 20. The frequency range converter 20 then produces a frequency modulation signal 50 based on the current state of the randomized signal 40. The current state is the current value of the particular characteristic of the signal that is being randomized. In the following embodiments, voltage is the randomized characteristic, but others, such as current, frequency, and phase may also be utilized. The frequency modulation signal 50 then drives a variable frequency oscillator 30, which generates an oscillating signal 60 that has a frequency based on the current state of the frequency modulation signal 50. To ensure that the oscillating signal 60 remains within a specified frequency range, the frequency range converter 20 limits the frequency modulation signal 50 so that the frequency of the oscillating signal 60 always operates within that frequency range. That frequency range is determined primarily by the technical requirements of the power converter being driven by the oscillating signal 60, the nature of the load to which power is being supplied, and other factors.

The oscillating signal 60 generated by electrical circuit 101 of FIG. 1 and similar circuits disclosed below is then presented to a comparator, such as the second comparator COMP$_2$ of FIG. A, replacing the typical single-frequency oscillating signal V$_{osc}$. The second comparator COMP$_2$ then compares the oscillating signal 60 with the output voltage monitor signal V$_{ovm}$ generated by the output voltage monitor circuit 3, with the output of COMP$_2$ thus generating the switch control signal for the power converter. In addition to the DC/DC buck converter of FIG. A, the electrical circuit 101 and related circuits discussed below may be employed within switching control circuit embodiments of the present invention used with other types of switching power converters, including, but not limited to, DC/DC boost converters, AC/DC converters, and DC/AC converters.

Concerning the randomized signal generator 10, the randomized signal 40 exhibits characteristics similar to what is commonly termed "white noise." In the context of the present invention, white noise is an electrical signal that possesses a continuous, uniform power spectral density over a particular frequency range. However, the randomized signal 40 need not exhibit complete or perfect uniformity in its power spectral density for most embodiments of the present invention, as sufficient reduction in EMI exhibited by the oscillating signal 60 ordinarily results from a less-than-perfect randomized signal 40.

Figure 2:
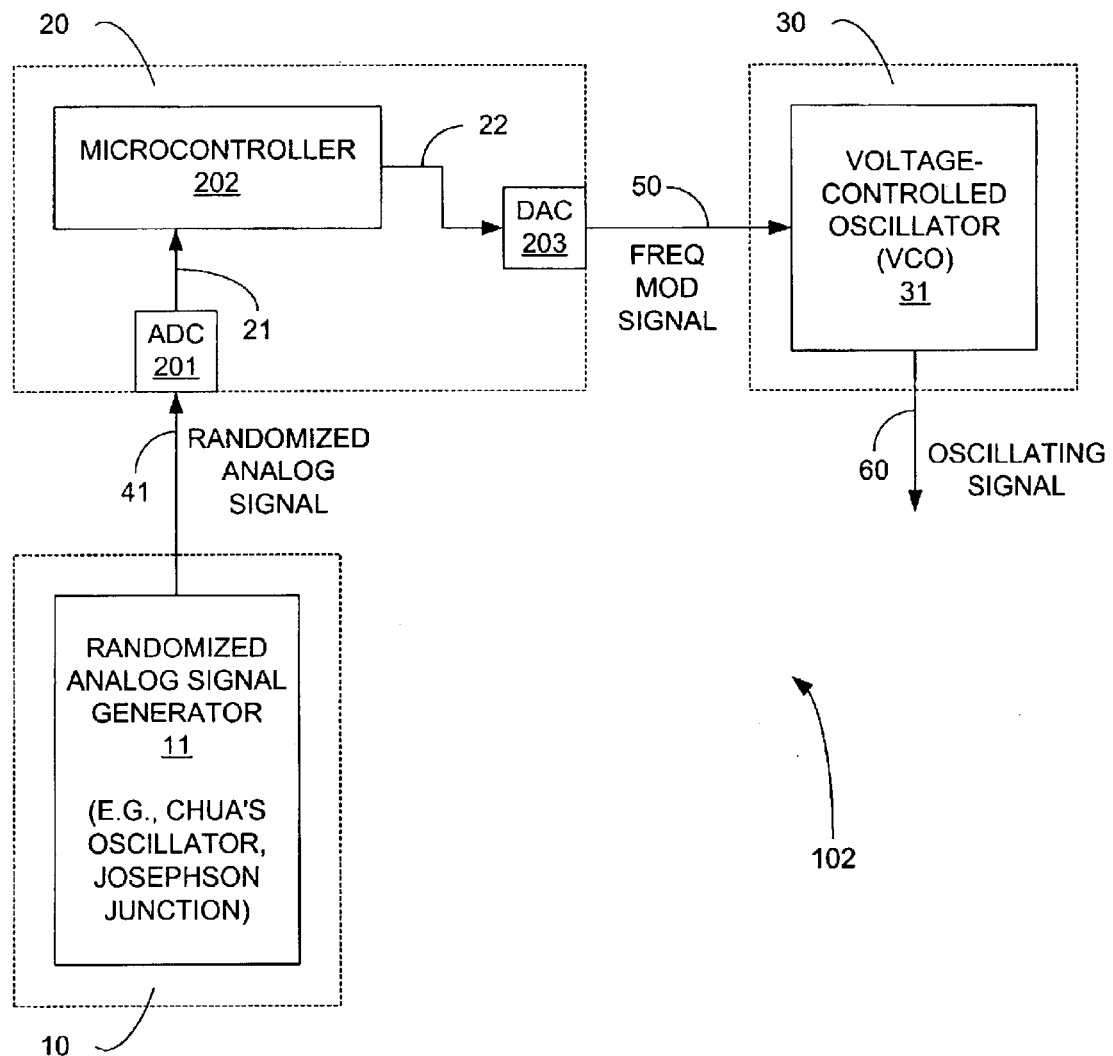
FIG. 2 is a more detailed block diagram of a portion of a power converter switching control circuit according to an embodiment of the invention that generates an oscillating signal.

The randomized signal 40 generated by the randomized signal generator 10 may be, for example, a randomized analog signal 41 (as shown in FIG. 2), the voltage of which varies with time. In this case, the voltage of the randomized analog signal 41 would be used for modulation purposes, as described below. Thus, in such an embodiment, the randomized signal generator 10 would be a randomized analog signal generator 11 (also shown in FIG. 2).

Many different types of electrical circuits that generate noise could be employed for the randomized analog signal generator 11. For example, a Josephson junction may be used for such a purpose. A Josephson junction, as described in the prior art, is a small circuit consisting of two layers of superconductor material separated by a thin nonsuperconductor. Although the Josephson junction is known primarily for extremely high switching speeds at very low temperatures, the thermal noise demonstrated by such a junction at higher temperatures is highly nonlinear and randomized in nature.

Another type of randomized analog signal generator 11 is Chua's oscillator, a nonlinear, chaotic oscillator well known in the art. Chua's oscillator also possesses the added advantage of producing a randomized analog signal 41 whose frequency range may be limited with proper selection of the values of the circuit components, such as resistors and capacitors, which make up the oscillator. Many other similar electrical circuits that generate randomized or chaotic electrical analog signals may also be employed as the randomized analog signal generator 11.

Figure 3:
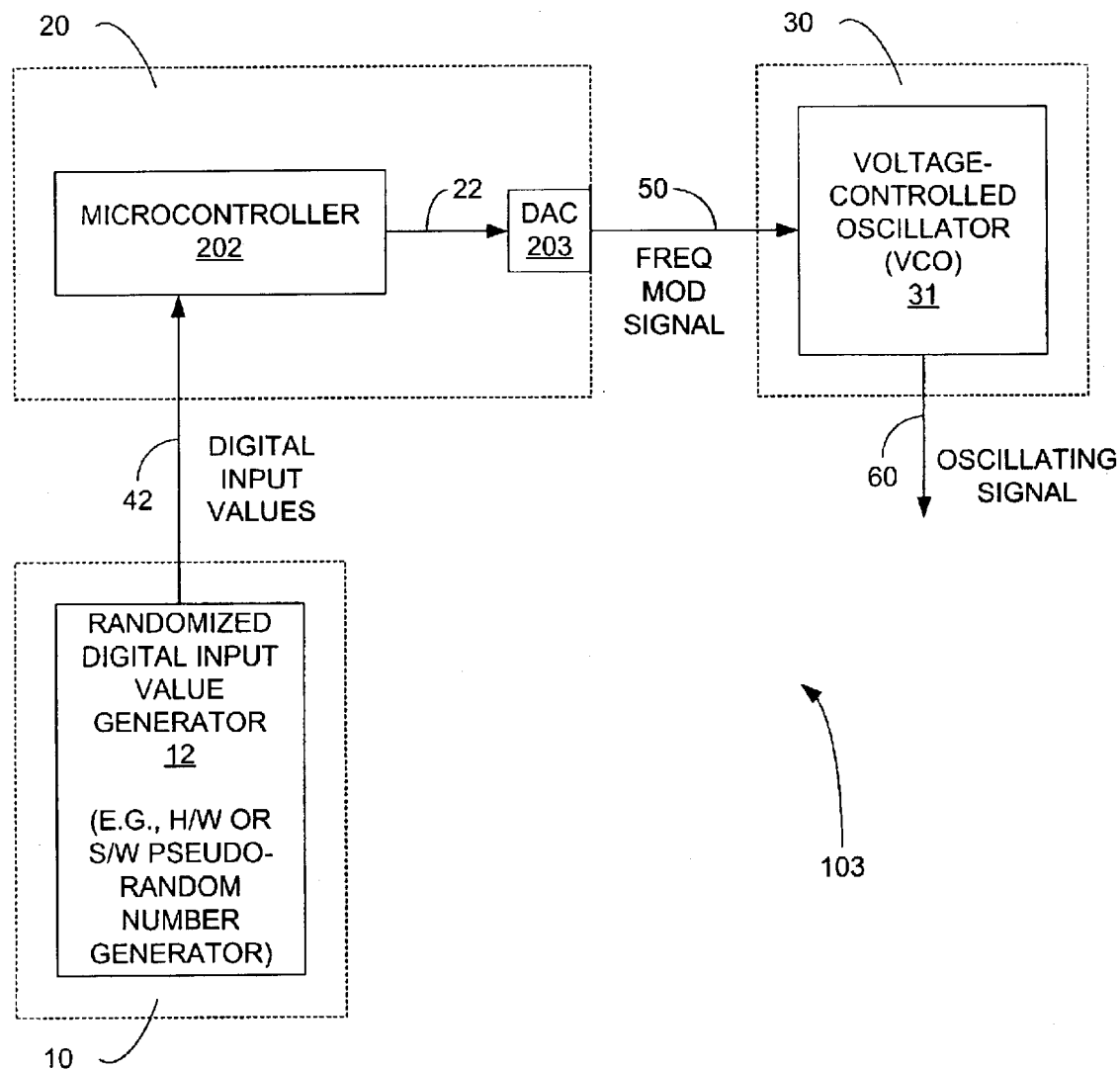
FIG. 3 is a more detailed block diagram of a portion of a power converter switching control circuit according to another embodiment of the invention that generates an oscillating signal.

The randomized signal 40 may also take the form of a series of randomized digital input values 42 generated by another type of randomized signal generator 10: a randomized digital input value generator 12, as shown in FIG. 3. For example, a hardware random or pseudorandom number generator may be employed to generate the series of randomized digital input values 42. Hardware random number generators normally utilize some randomized physical process, such as a thermal noise generation circuit, to generate a series of random numbers. Hardware pseudorandom number generators employ a hardware implementation of a mathematical algorithm to generate a series of numbers that appear quite random, but are still deterministic if enough is known about the algorithm. Hardware random and pseudorandom number generators may be embodied in field-programmable gate arrays (FPGAs), application-specific integrated circuits (ASICs) or similar integrated circuits (ICs). Also, a software implementation of a pseudorandom number generator may also be employed. Such software algorithms are commonly performed using, for example, a microcontroller, which may be a microprocessor or similar computer-based circuit capable of running a computer program or algorithm.

The randomized signal 40 generated by the randomized signal generator 10 is then used to drive a frequency range converter 20. In the embodiment of FIG. 2, in which a randomized analog signal 41 is employed, an analog-to-digital converter (ADC) 201 is used to periodically convert the randomized analog signal 41 into a series of digital input values 21 for use by a microcontroller 202. The microcontroller 202 then generates a digital output value 22 based on each digital input value 21 received from the ADC 201. Each digital output value 22 is then converted back to an analog voltage by way of a digital-to-analog converter (DAC), thus creating the frequency modulation signal 50.

The frequency range converter 20 ensures that no digital output value 22 causes the oscillating signal 60 of the variable frequency oscillator 30 to operate outside the specified frequency range. A simple method for meeting this requirement is to pass all digital input values 21 unmodified as digital output values 22 that result in a proper frequency for the oscillating signal 60. For those digital input values 21 that do not result in a proper frequency for the oscillating signal 60, the frequency range converter 20 may "clip" impermissibly high digital output values 22 so that the frequency modulation signal 50 causes the generation of the oscillating signal 60 at the highest allowable frequency within the specified range. Likewise, impermissibly low digital output values 22 may be "boosted" so that the frequency of the oscillating signal 60 is no lower than that allowed. Optionally, those digital input values 21 that fall outside of a prescribed range may be "mapped" to other values within the range. Such mapping may be either constant or variably dependent on previous digital input values 21 received by the frequency range converter 20.

More sophisticated methods of ensuring that the frequency of the oscillating signal 60 remains within its specified range may also be employed. For example, if the ultimate range of digital input values 21 is known with certainty, the frequency range converter 20 may then "scale" the digital input values 21 to a broader or narrower range of digital output values 22 so that the range of digital output values 22 being produced closely matches the frequency range specified for the oscillating signal 60. Optionally, clipping and boosting may then be applied atop this scaling algorithm to ensure that the frequency restrictions of the oscillating signal 60 are met.

Other algorithms that produce digital output values 22 based on the digital input values 21 that allow the oscillating signal 60 to operate within the specified frequency range may also be employed.

As noted above, in the embodiment shown in FIG. 3, the frequency range converter 20 may receive a series of randomized digital input values 42. In that particular case, the microcontroller 202 receives these values directly, as opposed to being converted by an ADC. Furthermore, if the randomized digital input values 42 are generated by a software algorithm on a microcontroller, a single microcontroller may serve as both the randomized digital input value generator 12 and the microcontroller 202 of the frequency range converter 20, thus reducing the amount of hardware required to implement this particular embodiment of the invention.

In some embodiments, the frequency range may be predetermined by being permanently set within the design of the frequency range converter 20 of the electrical circuit 101. This type of embodiment would be appropriate for cases in which the range of operation of the circuit is known at the time of the design. In other embodiments, the use of a modifiable frequency range, allowing programmability of both the extent of the allowed frequency range, and its location within the frequency spectrum, may be desirable. For example, in the case of a test and measurement instrument employed to analyze electrical signals at a variety of frequencies, control over the allowed frequency range of the oscillating signal 60 may be desirable, with the range being dependent on the frequency range of the signals being analyzed at a particular time.

Similarly, alternate embodiments of the present invention may also allow either a modulated version of the oscillating signal 60, as described above, or an unmodulated oscillating signal 60 operating at some fundamental frequency. This option may be desirable in circumstances where operation of the power converter at a single frequency at times presents no problem to nearby electronic circuits.

The frequency modulation signal 50, produced by the frequency range converter 20, then drives a variable frequency oscillator 30, which generates the oscillating signal 60, the frequency of which depends on the current state of the frequency modulation signal 50. In the embodiments of the electrical circuit 102, 103, shown in FIG. 2 and FIG. 3, the variable frequency oscillator 30 is a voltage-controlled oscillator (VCO) 31. As is well known in the art, a VCO generates an output signal of a particular frequency based on the voltage present at the input of the VCO, with a higher voltage causing the output to operate at a higher frequency. Thus, as the voltage of the frequency modulation signal 50 increases or decreases, the frequency of the oscillating signal 60 tracks those changes.

Figure 4:
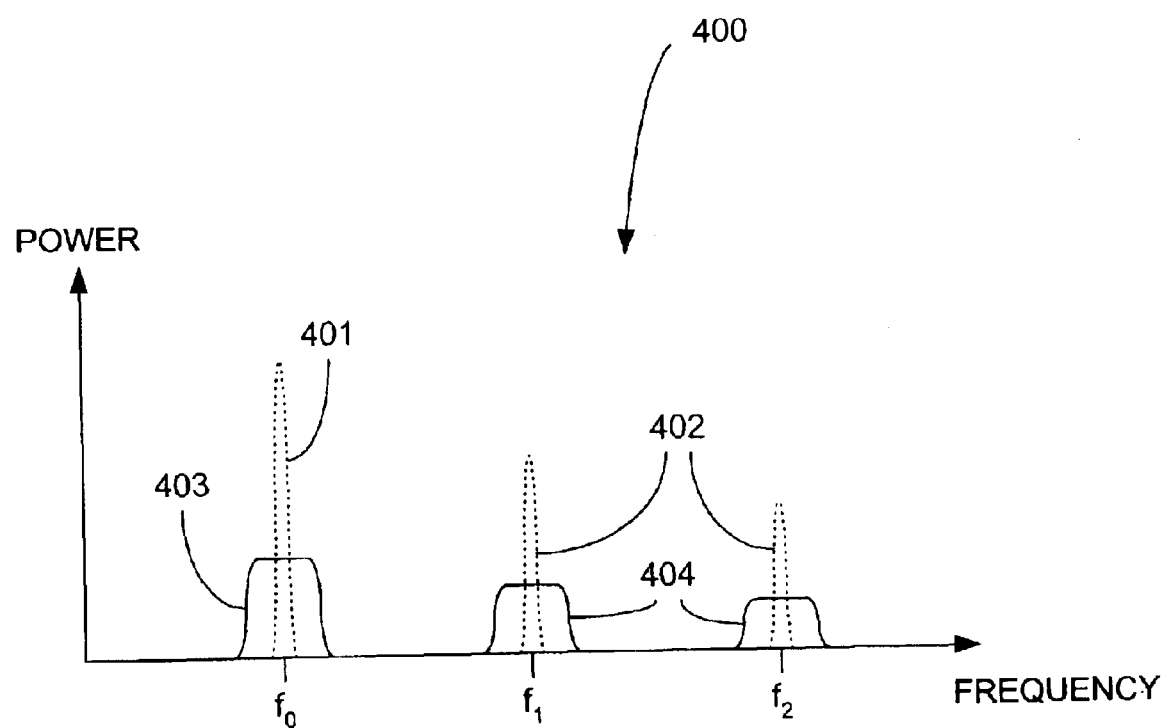
FIG. 4 is a simplified power spectral density graph representing the expected reduction in EMI of a power converter by modulation of the oscillating signal employed in a portion of a switching control circuit according to an embodiment of the invention.

The effect of embodiments of the invention on the power spectral density of an energy storage component (such as an inductor) of a power converter utilizing the above-described switching control circuit is shown by way of a simplified frequency spectrum chart 400 in FIG. 4. The dashed waveform indicates the typical power spectral density of a power converter using an unmodulated oscillating signal, consisting of a spike 401 at a fundamental frequency $f_0$, which is the frequency at which the unmodulated oscillating signal operates. Assuming that the unmodulated oscillating signal is not a perfect sinusoidal wave, spikes 402 at harmonics of the fundamental frequency, shown in FIG. 4 as $f_1$ and $f_2$, will also be present. As discussed above, the magnitude of the power of the unmodulated oscillating signal at those frequencies $f_0$, $f_1$, $f_2$ is often at sufficiently high levels to cause improper operation of electrical circuits near the power converter by way of EMI.

Conversely, the magnitude of the power spectral density of the power converter when driven by an embodiment of a switching control circuit of the present invention are much reduced in comparison to those in which an unmodulated oscillating signal is used. Denoted by the fundamental "bump" 403 and the harmonic bumps 404 in FIG. 4, the reduced magnitude of the power spectral density is accomplished by the randomized nature of the modulation performed by embodiments of the invention. This modulation spreads out the frequency range of the fundamental and harmonic frequencies of the oscillating signal 60 while limiting that range of frequencies based on the requirements of the power converter being driven by the switching control circuits of the present invention.

Generally, the specific embodiments discussed above employ the varying nature of the voltage of the randomized, signal 40 to ultimately vary the frequency of the oscillating signal 60 to reduce the EMI generated. Signals which exhibit other randomly or pseudorandomly varying characteristics may also be used. For example, a randomized signal 40 with a randomly varying frequency may be utilized to modulate the frequency of the oscillating signal 60. The frequency range converter 20 would then be required to detect the changes in frequency of the randomized signal 40, and produce a frequency modulation signal 50 based on the frequency of the randomized signal 40. As in the embodiments discussed above, the frequency range converter 20 would also be tasked with ensuring that the frequency modulation signal 50 does not force the frequency of the oscillating signal 60 beyond its acceptable range. Additionally, other varying characteristics of a randomized signal, such as current or phase, could also be employed as the randomized variable used for modulation purposes.

Figure 5:
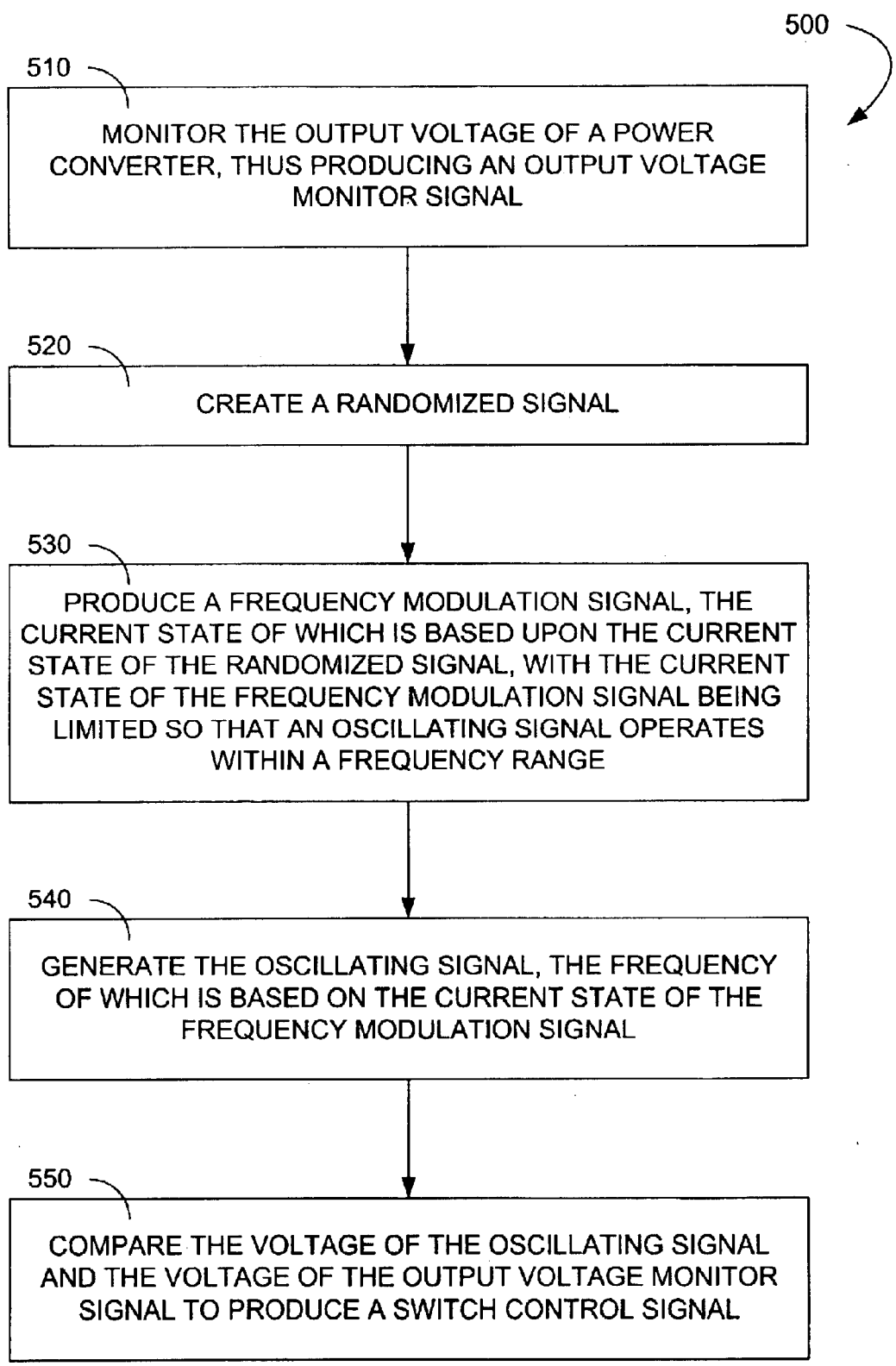
FIG. 5 is a flow diagram of a method according to an embodiment of the invention of generating a switch control signal for a power converter.

Embodiments of the present invention may also take the form of a method of generating a switch control signal for a switching power supply exhibiting reduced EMI. As shown in FIG. 5, such a method 500 involves monitoring the output voltage of the power converter to produce an output voltage monitor signal (step 510). Also, a randomized signal is created (step 520), with some characteristic of that signal, such as amplitude, frequency, or the like, being randomized. Also, as noted above, the randomized signal may be a randomized analog signal or a series of digital input values. A frequency modulation signal, which is based on the current state of the randomized signal, is then produced (step 530). The oscillating signal, the frequency of which is based on the current state of the frequency modulation signal, is then generated (step 540). Further, the frequency modulation signal is limited to ensure the operation of the oscillating signal within a specified frequency range (also step 530), which may be predetermined or modifiable. Finally, the voltages of the oscillating signal and the output voltage monitor signal are compared, resulting in the switch control signal (step 550).

Figure 6:
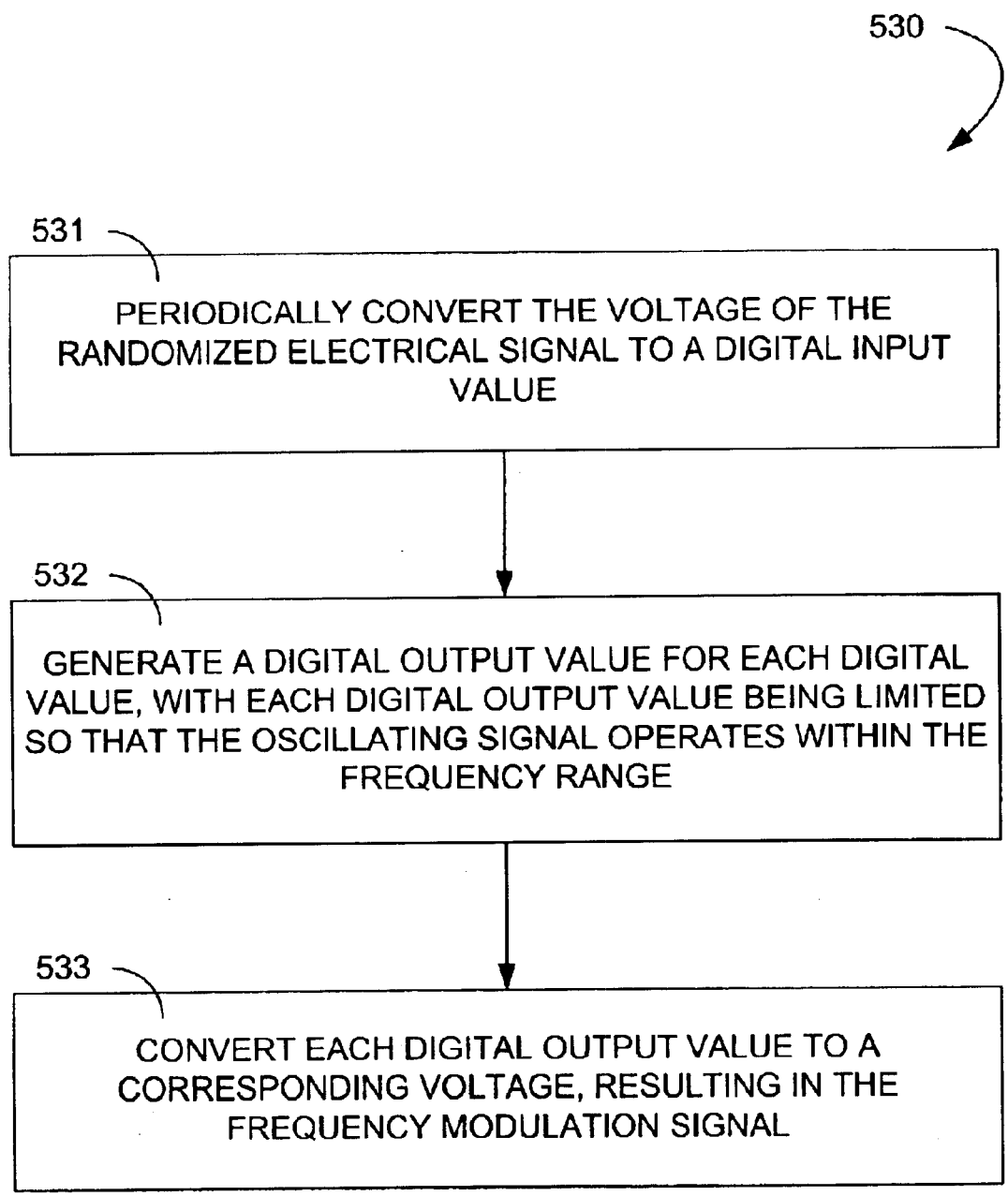
FIG. 6 is a flow diagram further describing the method step of producing a frequency modulation signal from FIG. 5 according to an embodiment of the invention.

In the case of the randomized signal being a randomized analog signal whose voltage exhibits random or pseudorandom behavior, the step of producing the frequency modulation signal (step 530 of FIG. 5) begins with periodically converting the voltage of the randomized signal to a digital input value (step 531 of FIG. 6). A digital output value for each digital input value is then generated (step 532), with each digital output value being limited so that the oscillating signal will operate within the specified frequency range. Methods such as clipping and scaling, described above, as well as others, may be employed. Each of the digital output values is then converted to a corresponding voltage, resulting in the frequency modulation signal (step 533). In the case that the randomized signal is a series of digital input values, the periodically converting step (step 531) would be unnecessary.

In alternate method embodiments, the frequency modulation signal may be held constant at times, causing the oscillating signal to operate at a single frequency, as discussed above.

Again, other method embodiments involving randomized signals possessing different characteristics other than voltage having a randomized quality may be employed, including current, frequency, and phase.

From the foregoing, embodiments of the invention provide an improved switching control circuit and method for a switching power converter that exhibits reduced EMI, thereby inflicting less noise upon surrounding circuits. Embodiments of the invention other than those shown above are also possible. As a result, the invention is not to be limited to the specific forms so described and illustrated; the invention is limited only by the claims.

What is claimed is:

1. A switching control circuit for generating a switch control signal for a switch of a power converter, the switch being operated so that the power converter produces reduced electromagnetic interference, the switching control circuit comprising:

an output voltage monitor circuit configured to monitor the output voltage of the power converter, the output voltage monitor circuit producing an output voltage monitor signal;

a randomized signal generator configured to create a randomized signal;

a variable frequency oscillator configured to generate an oscillating signal, the frequency of the oscillating signal being based on a current state of a frequency modulation signal;

a frequency range converter configured to produce the frequency modulation signal, the current state of the frequency modulation signal being based upon a current state of the randomized signal, the frequency range converter limiting the current state of the frequency modulation signal so that the oscillating signal operates within a frequency range; and a comparator configured to compare the voltage of the oscillating signal and the voltage of the output voltage monitor signal, the comparator producing the switch control signal.

2. The switching control circuit of claim 1, wherein the variable frequency oscillator is a voltage-controlled oscillator (VCO), the VCO generating the oscillating signal whose frequency is based on the voltage of the frequency modulation signal.

3. The switching control circuit of claim 1, wherein the randomized signal is a randomized analog signal, the voltage of which varies with time.

4. The switching control circuit of claim 3, wherein the randomized signal generator is a Josephson junction.

5. The switching control circuit of claim 3, wherein the randomized signal generator is a Chua's oscillator.

6. The switching control circuit of claim 3, wherein the frequency range converter comprises:

an analog-to-digital converter (ADC) configured to periodically convert the voltage of the randomized analog signal to a digital input value;

a microcontroller configured to generate a digital output value for each digital input value, with each digital output value being limited so that the oscillating signal operates within the frequency range; and a digital-to-analog converter (DAC) configured to convert each digital output value to a corresponding voltage, resulting in the frequency modulation signal.

7. The switching control circuit of claim 1, wherein the randomized signal comprises a series of randomized digital input values.

8. The switching control circuit of claim 7, wherein the randomized signal generator is a hardware random number generator.

9. The switching control circuit of claim 7, wherein the randomized signal generator is a hardware pseudorandom number generator.

10. The switching control circuit of claim 7, wherein the randomized signal generator is an embedded microcontroller performing a pseudorandom number generation algorithm.

11. The switching control circuit of claim 7, wherein the frequency range converter comprises:

a microcontroller configured to generate a digital output value for each randomized digital input value, with each digital output value being limited so that the oscillating signal operates within the frequency range; and a digital-to-analog converter (DAC) configured to convert each digital output value to a corresponding voltage, resulting in the frequency modulation signal.

12. The switching control circuit of claim 1, wherein the frequency range is predetermined.

13. The switching control circuit of claim 1, wherein the frequency range is modifiable.

14. The switching control circuit of claim 1, wherein the frequency modulation signal is held constant selectably so that the oscillating signal operates essentially at a single frequency.

15. A power converter containing the switching control circuit of claim 1.

16. The power converter of claim 15, wherein the power converter is a DC/DC buck converter.

17. The power converter of claim 16, wherein the output voltage monitor circuit comprises:

a voltage divider configured to divide the output voltage of the DC/DC converter to produce a reduced output voltage signal; and a second comparator configured to compare the reduced output voltage signal with a DC voltage reference to produce the output voltage monitor signal.

18. The power converter of claim 15, wherein the power converter is a DC/DC boost converter.

19. The power converter of claim 15, wherein the power converter is an AC/DC converter.

20. A switching control circuit for generating a switch control signal for a switch of a power converter, the switch being operated so that the power converter produces reduced electromagnetic interference, the switching control circuit comprising:

means for monitoring the output voltage of the power converter, the monitoring means producing an output voltage monitor signal;

means for creating a randomized signal;

means for generating an oscillating signal, the frequency of the oscillating signal being based on a current state of a frequency modulation signal;

means for producing the frequency modulation signal, the current state of the frequency modulation signal being based upon a current state of the randomized signal, the producing means limiting the current state of the frequency modulation signal so that the oscillating signal operates within a frequency range; and means for comparing the voltage of the oscillating signal and the voltage of the output voltage monitor signal, the comparing means producing the switch control signal.

21. The switching control circuit of claim 20, wherein the randomized signal is a randomized analog signal, the voltage of which varies with time.

22. The switching control circuit of claim 21, wherein the producing means comprises:
  means for periodically converting the voltage of the randomized analog signal to a digital input value;
  means for generating a digital output value for each digital input value, with each digital output value being limited so that the oscillating signal operates within the frequency range; and
  means for converting each digital output value to a corresponding voltage, resulting in the frequency modulation signal.

23. The switching control circuit of claim 20, wherein the randomized signal comprises a series of randomized digital input values.

24. The switching control circuit of claim 23, wherein the producing means comprises:
  means for generating a digital output value for each randomized digital input value, with each digital output value being limited so that the oscillating signal operates within the frequency range; and
  means for converting each digital output value to a corresponding voltage, resulting in the frequency modulation signal.

25. The switching control circuit of claim 20, wherein the frequency range is predetermined.

26. The switching control circuit of claim 20, wherein the frequency range is modifiable.

27. The switching control circuit of claim 20, wherein the frequency modulation signal is held constant selectably so that the oscillating signal operates essentially at a single frequency.

28. A power converter containing the switching control circuit of claim 20.

29. The power converter of claim 28, wherein the power converter is a DC/DC buck converter.

30. The power converter of claim 29, wherein the monitoring means comprises:
  means for dividing the output voltage of the DC/DC converter to produce a reduced output voltage signal; and
  means for comparing the reduced output voltage signal with a DC voltage reference to produce the output voltage monitor signal.

31. The power converter of claim 28, wherein the power converter is a DC/DC boost converter.

32. The power converter of claim 28, wherein the power converter is an AC/DC converter.

33. A method for generating a switch control signal for a switch of a power converter, the switch being operated so that the power converter produces reduced electromagnetic interference, the method comprising:
  monitoring the output voltage of the power converter, the monitoring step producing an output voltage monitor signal;
  creating a randomized signal;
  generating an oscillating signal, the frequency of the oscillating signal being based on a current state of a frequency modulation signal;
  producing the frequency modulation signal, the current state of the frequency modulation signal being based upon a current state of the randomized signal, the producing step limiting the current state of the frequency modulation signal so that the oscillating signal operates within a frequency range; and
  comparing the voltage of the oscillating signal and the voltage of the output voltage monitor signal, the comparing step producing the switch control signal.

34. The method of claim 33, wherein the randomized signal is a randomized analog signal, the voltage of which varies with time.

35. The method of claim 34, wherein the producing step comprises:
  periodically converting the voltage of the randomized analog signal to a digital input value;
  generating a digital output value for each digital input value, with each digital output value being limited so that the oscillating signal operates within the frequency range; and
  converting each digital output value to a corresponding voltage, resulting in the frequency modulation signal.

36. The method of claim 33, wherein the randomized signal comprises a series of randomized digital input values.

37. The method of claim 36, wherein the producing step comprises:
  generating a digital output value for each randomized digital input value, with each digital output value being limited so that the oscillating signal operates within the frequency range; and
  converting each digital output value to a corresponding voltage, resulting in the frequency modulation signal.

38. The method of claim 33, wherein the frequency range is predetermined.

39. The method of claim 33, wherein the frequency range is modifiable.

40. The method of claim 33, wherein the frequency modulation signal is held constant selectably so that the oscillating signal operates essentially at a single frequency.

41. A power converter performing the method of claim 33.

42. The power converter of claim 41, wherein the power converter is a DC/DC buck converter.

43. The power converter of claim 33, wherein the monitoring step comprises:
  dividing the output voltage of the DC/DC converter to produce a reduced output voltage signal; and
  comparing the reduced output voltage signal with a DC voltage reference to produce the output voltage monitor signal.

44. The power converter of claim 41, wherein the power converter is a DC/DC boost converter.

45. The power converter of claim 41, wherein the power converter is an AC/DC converter.

* * * * *